A. M. GRISWOLD.
Corn-Planters.
No. 147,768.
Patented Feb. 24, 1874.
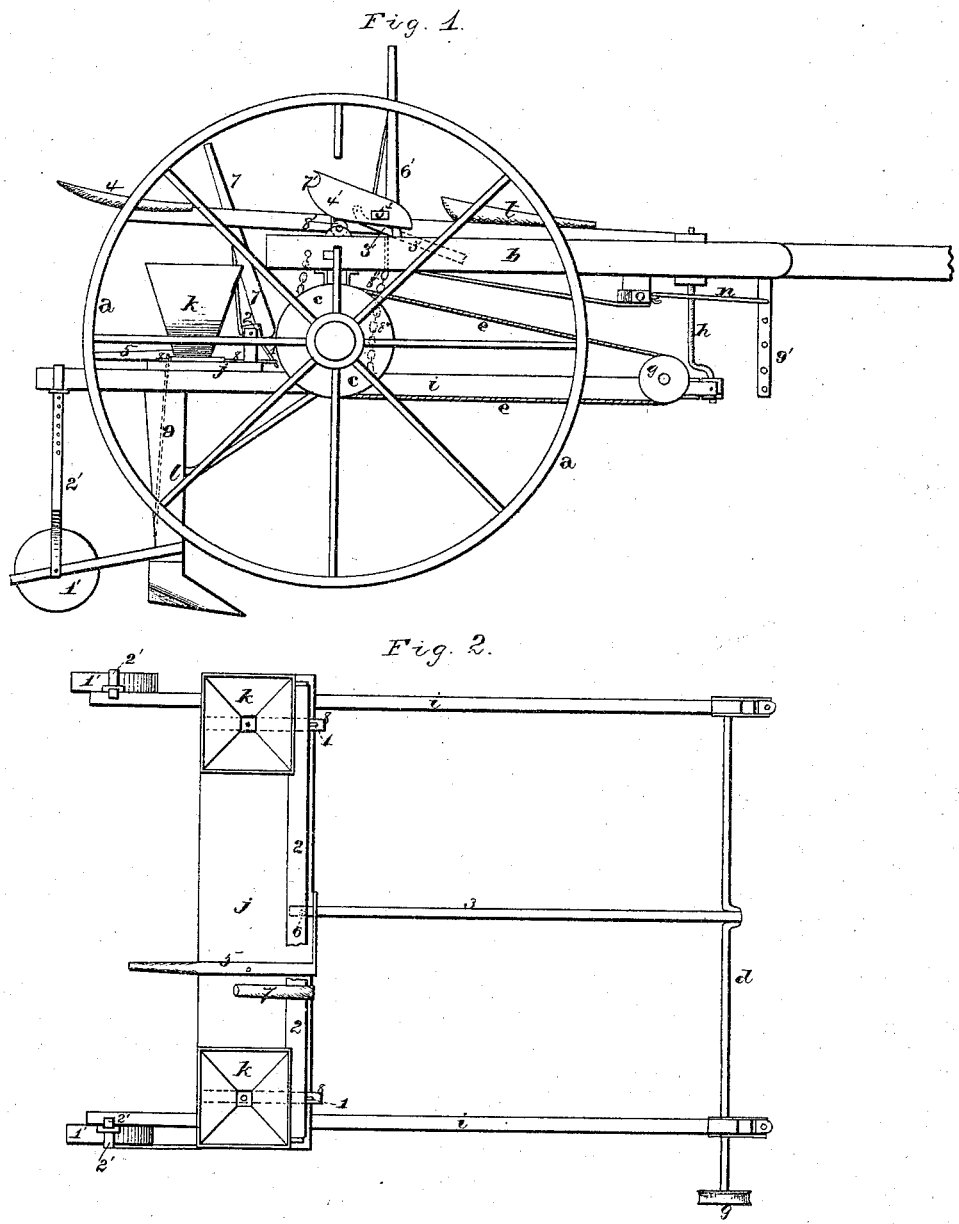
WITNESSES.
Wm E. Chaffee
Harry Coleman
INVENTOR.
A. M. Griswold
per Daniel Breed.
Attorney.

UNITED STATES PATENT OFFICE.

ABRAM M. GRISWOLD, OF MOMENCE, ILLINOIS.

IMPROVEMENT IN CORN-PLANTERS.

Specification forming part of Letters Patent No. 147,768, dated February 24, 1874; application filed September 2, 1873.

*To all whom it may concern:*

Be it known that I, ABRAM M. GRISWOLD, of Momence, in the county of Kankakee and State of Illinois, have, as I believe, invented new and useful Improvements in Planters and Cultivators Combined; and I do hereby declare the following to be a full and exact description of the same, reference being had to the drawings that accompany and form a part of this specification.

The nature of my invention relates to an improvement in corn-planters; and it consists in the combination of parts, which will be more fully described hereafter.

The accompanying drawings represent my invention.

*a* represents the driving-wheels, upon which the frame *b* is supported in the usual manner. To the inside of one of these wheels is secured a driving-pulley, *c*, which communicates motion to the crank-shaft *d* through the cord or chain *e* and pulley *g* on its outer end. This shaft extends across under the front end of the frame, and serves as pivot, upon which the seeding-frame is pivoted, the front ends of the plow-beams, upon which the seeding devices rest, being secured to the front end of the frame *b* by the rods *h*. The beams *i* have their rear ends rigidly connected together by the board *j*, to each end of which is secured a seed-box, *k*, placed just above the hollow cultivator-standards *l*. The slides of the seed-boxes are connected to the rocking lever 2 by the rods 1, the lever or shaft being intended to be operated either by hand or by the crank-shaft through the connecting-rod 3.

When it is desired that the seed should be dropped evenly and regularly, the driver, sitting on the rear seat 4, can, by a movement of the foot, move the lever 5, pivoted to the top of the board *j*, so as to hold the notch in the end of the connecting-rod 3 against or in gear with the rod 6, projecting downward from the under side of the rocking shaft or lever 2, so that the revolutions of the crank will rock the shaft, and thus operate the slides.

When it is desired to operate the slides by hand or to throw them out of gear while moving to and from the field, the lever 5 is moved so as to throw the rod 3 away from the rod 6, and then the slides will remain at rest, or the driver can rock the shaft by means of the hand-lever 7 within easy reach of the seat 4.

To the rear end of each of the slides 8 is secured a long flat spring, 9, which not only serves to return the slide to position again after having been moved, but to close the rear sides of the hollow standards *l*, so as to prevent the grain from falling out. To the rear of the standards are pivoted the covering-rollers 1', which can be adjusted up and down by the perforated rod 2'. Upon each side of the frame *b*, near its rear end, is pivoted, by means of the rod 3', the catches 4'. These catches are connected together by a bar, 5', which extends across the top of the frame, and to which the hand-lever 6' is secured. By drawing backward upon the hand-lever, the catches will be moved from the horizontal position shown to a vertical one, when the notch 7' will catch upon the top of the roller 8', pivoted in a suitable frame or holder upon the top of the frame, and upon which the catch rests while in the position shown in Fig. 1. Connected to the bar 5' by the chains 8'' are the beams *i*, so that when the catches are drawn back the beams will be raised upward, so as to clear the shovels from the earth. Pivoted to the front end of the frame *b*, upon each side, is a pendent lever, 9', to which the draft is secured. In order to equalize the draft of both animals, these draft-levers are connected to the cross-bar *o*, which extends across the under side of the frame, by the rod *n*, so that the slackness on one side will be instantly taken up on the other. In the center of the frame *b*, and upon the same bar as the one 4, is a second seat, *t*, upon which the driver can sit while using the machine for cultivating alone.

Having described my invention, I claim—

The coupling-lever 5, crank-shaft *d*, notched connecting-rod 3, rock-shaft 2, rods 1, and seed-slides 8, combined substantially as shown.

ABRAM M. GRISWOLD.

Witnesses:
BENJ. F. GRAY,
FARMON SCRAMLIN.